Dec. 30, 1969  G. F. LINDSAY ET AL  3,487,203
TORSIONAL DELAY LINE MATCHED FILTER DEVICE
Filed Dec. 7, 1966
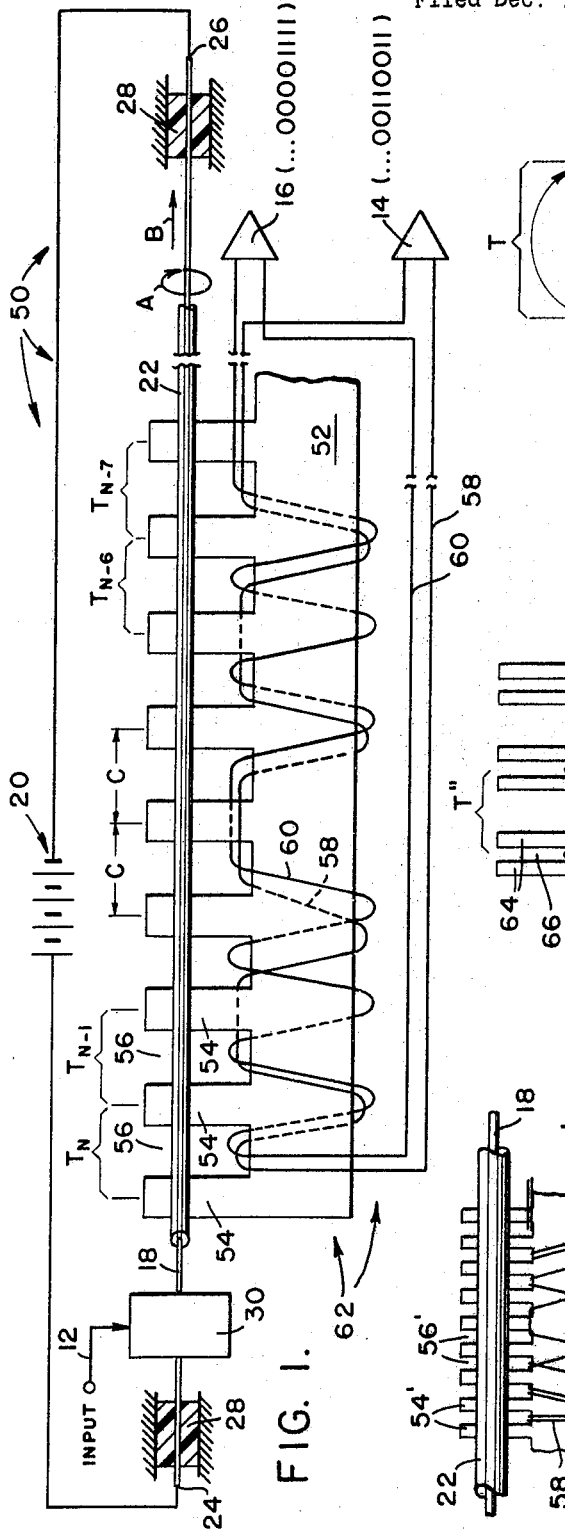
INVENTORS.
GEORGE F. LINDSAY
HARPER J. WHITEHOUSE
BY
MICHAEL F. OGLO
ROY MILLER
ATTORNEYS.

United States Patent Office 3,487,203
Patented Dec. 30, 1969

3,487,203
TORSIONAL DELAY LINE MATCHED FILTER DEVICE
George F. Lindsay, Arcadia, and Harper John Whitehouse, Hacienda Heights, Calif., assignors to the United States of America as represented by the Secretary of the Navy
Filed Dec. 7, 1966, Ser. No. 599,976
Int. Cl. G06g 7/19; G06f 15/34
U.S. Cl. 235—181                              10 Claims

ABSTRACT OF THE DISCLOSURE

A matched filter device having a plurality of response characteristics matched to a corresponding plurality of distinct binary sequences. Two or more polarity coding wires are interlaced through successive slots formed between the teeth of an elongated comb-shaped element of magnetic material. Each wire corresponds to one of the binary sequences and is selectively threaded through the successive slots in one or the other of opposite transverse directions, through a slot, in accordance with whether the corresponding digit of the sequence is a zero (0) digit or a one (1) digit. The delay line is disposed across the comb-shaped element in parallel alignment with the longitudinal axis of the latter, and is disposed laterally outwardly from the wires which interlace the slots. A voltage source is coupled to the ends of the delay line in order to generate a quiescent circular magnetic flux field thereabout along its length.

---

The invention described herein may be manufactured and used by or for the Government of the United States of America for governmental purposes without the payment of any royalties thereon or therefor.

This invention relates to improvements in matched filter device of the type which employ torsional mode acoustic delay lines. This type of matched filter device has a utility in the generation and detection of sonar pulses in correlation detection sonar systems. Illustration of prior art devices of this type are disclosed in the copending application of H. J. Whitehouse, S.N. 333,241 entitled "Delay Line Signal Detector," filed Dec. 24, 1963, now Patent 3,290,649, and the copending application of H. J. Whitehouse and G. F. Lindsay entitled "Multiple Code Delay Line Correlator," S.N. 499,111, filed Oct. 20, 1965.

The technical capabilities of the device disclosed in the above mentioned copending application, S.N. 499,111 and that of the present invention are essentially the same. Both are a construction requiring a single delay line, but providing a multiplicity of distinct modes of matched filter response, including the capability to selectively generate a signal having an impulse characteristic of the desired mode, and the capability to discriminate the different modes in detecting signals.

However, the structure of the device disclosed in Patent 3,290,649 is intrinsically difficult and expensive to fabricate. That structure includes a set of toroidal transformer cores. In a typical embodiment the set of cores will consist of 1024 individual cores. A plurality of polarity encoding wires are strung through the set of cores. Each polarity encoding wire is individually threaded through the aperture of every individual core of the set. The desired matched filter response codes are synthesized by selectively threading the polarity encoding wires through the individual cores of the set in one or the other of the two possible transverse directions relative to the plane of the core aperture, in accordance with a predetermined binary sequence code. Each polarity encoding wire serves to synthesize a distinct code. In many instances, such as where a so-called psuedo-random sequence is to be synthesized, the binary sequence code is wholly non-periodic and random. Therefore, the sequential order of the direction of threading of wires through successive cores of the set will vary, both in the sequence of stringing of a single wire, and as between different wires. Also, since the wire must be threaded through the closed apertures of the cores, the wire cannot be strung directly from a spool or reel. Further, since a typical operational embodiment employs extremely small toroid cores, having an inner diameter of the order of .050", the use of a bobbin in stringing the cores entails difficulties. Any construction of bobbin which is thin enough to pass through such a small aperture, is severely limited in the length of wire which it may carry as its bobbin winding. This in turn will make repeated splicing of the wire necessary. Accordingly, it is believed apparent that a large magnitude of hand labor, and a high degree of tedium (which makes the work prone to error) is required in the fabrication of the structure of copending application S.N. 499,111.

An object of the invention is to provide a novel and improved torsional mode acoustic delay line, which provides a multiplicity of matched filter response modes, and which is easy to fabricate.

Other objects and many of the attendant advantages of this invention will be readily appreciated as the same becomes better understood by reference to the following detailed description when considered in connection with the accompanying drawings wherein:

FIG. 1 is a diagrammatic illustration of a torsional delay line device embodying the present invention;
FIG. 2 is an enlarged detail of FIG. 1;
FIG. 3 is an enlarged side elevation of comb-shaped element of an operational embodiment of the invention;
FIG. 4 illustrates a modified form of invention; and
FIG. 5 illustrates another modified form of invention.

Referring now to the drawing and in particular to FIG. 1, the subject of the invention is an improved torsional delay line matched filter device 50. The parts of device 50 which will first be described have counterparts in the previously cited copending application in S.N. 499,111, and have been designated by the same referenced characters as used in that application. Also, it is to be understood that the embodiment shown in FIG. 1 illustrates device 50 with its input and output connections arranged for utilizing same in the detection of particular signal impulse characteristics. The needed rearrangements in order to utilize the device for generating a pulse, will be described later in the text.

An example of the use of device 50 is the detection of the presence of any of a plurality of predetermined serial binary signals in a signal channel, and to indicate which signal is present. The signal source is connected to an input lead 12. For purposes of illustrating the invention, it is assumed that the signal source connected to lead 12 is known to contain a continuous serial binary impulse wave signal having a data rate of 2 million bits per second. Preferably, the input signal is of one of the conventional serial binary impulse wave forms in which the signal intelligence is contained in a band pass centered about a frequency corresponding to the data rate. One such form of signal is the so-called "Manchester Code." An output amplifier 14 is connected at the output of the signal channel for indicating presence of a predetermined serial binary sequence signal code having N bits, ending with the binary digit sequence . . . 0, 0, 1, 1, 0, 0, 1, 1. The value of N is usually in excess of one hundred (100). A typical operation embodiment for use in correlation detection sonar systems would employ a sequence having a one-thousand and twenty-four (1024) bit. Another output amplifier 16 is connected at the output of the signal channel for indicating the presence of a binary sequence code of N bits ending with the binary digit sequence . . . 0, 0, 0, 0, 1, 1, 1, 1. An operational embodiment would typically include more than two outputs, the total number being limited by the bulkiness of the wiring as will become understood as the specification proceeds.

Due to the fact that the sequence of input pulses may consist of any combination of positive and negative pulses and of arbitrary amplitude, it is difficult to make a general statement about the form of the overall output signal, except that the amplitude of the output signal, barring unusual noise conditions, will have a greater amplitude when the entire pulse sequence matches the coding of the inductive interaction tap stations than when less than the entire pulse sequence matches the coding of the tap stations. For example, if the input pulses are spaced at regular time intervals and the plurality of the tap stations of the matched filter device 50 are physically spaced to detect this specific sequence of pulses, then the output signal will generally increase in some manner as the steadily increasing number of input pulses coincides in space with the tap stations, and a maximum output will be obtained when all of the regularly spaced input pulses, in the time domain, match the physical spacing of the total number of tap stations. Thereafter, as the pulse train continues along the delay line, there will be a decreasing number of matches of input pulses and tap stations and the output response will decrease in some fashion.

Some other types of sequences of input pulses, for example of a random time spacing, may result in an output from the output amplifier 14 or 16 which is near zero at all times except when the coded information is identical to the predetermined sequence, at which time the output signal is of high amplitude.

A torsional acoustic mode delay line wire 18 made of magneto-strictive or magneto-elastic materials has a voltage source 20 coupled across its ends, which produces a continuous quiescent field of concentric circular lines of magnetic flux, illustrated by magnetic line of force A, along the length of the line. A loose fitting insulation sleeve 22 covers wire 18 except for small sections adjacent each end. The ends of the line are designated as an input end 24 and a terminal end 26, each of which are provided with a conventional acoustic absorption termination 28. An electric-acoustic torque wave transducer 30 is operatively connected to the line adjacent its input end 24. The input lead 12 of device 50 is connected to the electric terminal side of this transducer. Torsional stress waves launched by transducer 30 propagate along the delay line in the direction of arrow B at a predetermined velocity of propagation. For purposes of illustration it is assumed that delay line 18 has a characteristic acoustic wave propagation velocity $V_c = 0.112$ inch per microsecond.

The parts of device 50 newly disclosed in connection with the present application and therefore without counterparts in the cited copending application, will now be described. A comb-shaped element 52 is formed from a strip of material which is magnetically permeable, but which does not exhibit appreciable magnetic remanence. Also the material is preferably one having low electrical conductivity. Suitable materials include metal strips of iron alloy of the type containing approximately 12% aluminum, such as are commercially available under the trade names of Alfenol or Alfer. Ferrite materials also meet the desired criterion. Element 52 contains uniformly spaced teeth 54, which project laterally from a continuous elongated shank portion of the strip. Corresponding slots 56 are formed between each adjacent pair of teeth. The total number of teeth provided on element 52 is $N+1$, where N is the number of binary digits in the previously described binary sequence codes which device 50 serves to detect. Since the binary sequence codes to be detected generally have an excess of 100 bits, it will be appreciated that the portion of the comb-shaped element 52 illustrated in the drawing is only a small fraction of its total length. Successive teeth 52 are spaced by a distance C equal to the separation between the individual binary impulse components in the continuous serial binary impulse wave signal propagating along delay line 18. The spacing of these impulse components may be conventionally calculated from the data rate of the input signal and the characteristic proparation velocity of the delay line. For example, with the illustrative values previously given, the spacing of the teeth is made at 0.056". As best shown in FIG. 2, the slot between adjacent teeth and one half the width of the adjoining teeth form an inductive interaction tap station T. The inductive interaction which takes place at these tap stations is described later herein. The tap stations are numerically designated in the sequential order of their appearance in the axial direction along line 18 which is opposite to the direction of propagation of an input signal, i.e. they are designated in the sequential order of their appearance from terminal end 26 to input end 24. Accordingly, the inductive tap interaction tap station nearest input end 24 is designated $T_N$, the next tap station away from the input end 24 is designated $T_{N-1}$, etc.

First and second polarity encoding wires, 58 and 60, are interlaced through the slots 56 of comb-shaped element 52. These wires, which are made of conventional insulated copper conductor wire, form the inputs to the previously described output amplifiers 14 and 16, respectively. Each wire is individually interlaced through each successive slot 56 of the sequence of tap stations $T_1$ (not shown) and $T_2$ (not shown) . . . $T_{N-1}$, $T_N$. The direction in which is threaded through a slot at an individual tap station of the sequence is preselected in accordance with the presence of a zero (0) digit or a one (1) digit in the corresponding bit position of the binary code sequence to be detected. Where the corresponding bit position of the code sequence has a binary zero (0) digit, the wire is threaded through the slot in the direction into the plane of the drawing, and vice versa. Thus polarity encoding wire 58, which is for the detection of code sequence . . . 0, 0, 1, 1, 0, 0, 1, 1, with the right-hand 1 entering the input 12 last, is threaded through the spaces of successive tap stations $T_{N-7}$ . . . $T_N$ as follows: $T_{N-7}$, into plane of drawing; $T_{N-6}$, into plane of drawing; $T_{N-5}$, out of plane of drawing; $T_{N-4}$, out of plane of drawing; $T_{N-3}$, into plane of drawing; $T_{N-2}$, into plane of drawing; $T_{N-1}$, out of plane of drawing; $T_N$, out of plane of drawing. Wire 60, which is for the detection of the code sequence . . . 0, 0, 0, 0, 1, 1, 1, 1, is threaded in an analogous manner. The selection of the directions of threading of the wire through the individual slots 56 is performed by a combination of winding the wire in a helical direction about the shank portion of the comb-shaped element 52, and winding of the wire about individual teeth in a serpentine fashion. If it is desired to pass the wire through the slot of the next successive tap station without reversal of direction of threading, the wire is helically wound about the shank portion of element 52. If a reversal of direction of threading is desired in the next succeeding tap station, the wire is passed around the side of the tooth in a serpentine manner, and brought back through the slot of the next succeeding station in the reverse direction.

It is to be noted that the arrangement of the binary digits along the delay line in the direction of propagation of an input signal along the delay line is backward from the order of appearance of the digits in the binary sequence code to be detected.

The comb-shaped element 52 and its code wires 58 and 60 together physically comprise a magnetic comb and code wire subassembly 62. The subassembly 62 and the delay line wire 18, with its loosely fitting insulation sleeve 22 thereabout are fastened together in the relative positions shown in the drawing in any suitable manner, such as by means of regularly spaced adhesive tape bindings, not shown. The delay line lies across the teeth 54 of comb element 52 parallel to the longitudinal axis of the comb element and is spaced laterally outward from where the wires are interlaced through the slots 56. The insulation tubing 20 about the delay line is in contact with the surface of the teeth 54. This places the delay line wire 18 in close proximity to the surface of the comb element 52, with only the wall thickness of the insulation tubing 22 separating wire 18 from the surface of the permeable material of the teeth. This closeness has been found sufficient to establish the necessary degree of magnetic coupling between the delay line and the structure of the comb element 52.

The inductive interaction taking place at each inductive interaction tap station T will now be described with reference to FIG. 2. As previously mentioned there is a quiescent circular field, arrow A, about the delay line, and the torsional impulses propagate along the line in the direction of arrow B. Motion of a torsional impulse through this circular field causes the impulse to be accompanied by an associated toroidal field of magnetic lines of force about the axis of the delay line. A toroidal field of this type is diagrammatically depicted in FIG. 2 by arrows D representing closed magnetic lines of force lying in the plane of the drawing. FIG. 2 is of course only a planar representation of the toroidal force field, which would further comprise similar lines of force in other radial planes through the axis of the wire. The intensity and polarity of these toroidal field magnetic lines of force at a given location along the line will depend upon the instantaneous magnitude and sense of motion of the torsional impulse moving across the inductive interaction tap station T. Thus, where a continuous serial binary impulse wave signal is launched along a delay line 18, the resulting toroidal fields moving along the line will, at a given tap station, appear as a toroidal field of varying polarity and intensity, corresponding to the binary intelligence of the impulse wave signal. The structure of the magnetically permeable comb element 52 adjacent to the space 56 at the tap station T provides a low reluctance magnetic circuit path for the toroidal field at such station. The structure forming this low reluctance path comprises the portions of the teeth adjoining the space 56 and the portion of the shank adjoining the bottom of the space. This magnetic circuit path links code wires 58 and 60, and flux of the toroidal field tends to concentrate itself within this magnetic circuit, resulting in a high degree of inductive coupling between the delay line and code wires.

In operation, the individual turns of the first and second polarity coding wires 58 and 60 each act as an inductive pickoff in which is induced a voltage of a sense of polarity and magnitude in accordance with the sense and magnitude of the induction-producing flux variation caused by the travel of a torsional impulse through a section of the delay line wire 18 adjacent to the tap station which is adjacent to each turn. This inductive phenomenon involves interaction of the torsional stress wave, the circular concentric flux produced by voltage source 20, and the individual turns of coding wires 58 or 60. Such inductive pickoff action takes place individually at all the turns of conductors 58 or 60.

For purposes of the present explanation, it may be assumed that the transformer coupling action between the tap stations and the coding wire 58 or 60 is such that transformer coupling takes place without voltage polarity inversion at stations where the coding wire is threaded through a comb slot in the direction appearing to enter the plane of the drawing from right to left, and with polarity inversion at tap stations where the coding wire is threaded through the comb slots in the opposite direction. The signal induced into the individual turns of coding wire 58 or 60 at those tap stations representing a "0" bit are therefore transformer-coupled into the coding wires without inversion, and the signals induced into the coding wire 58 or 60 at tap stations representing a "1" bit are coupled into the code wires with polarity inversion.

Since elemental induced voltages from all the tap stations are simultaneously coupled into a coding wire 58 or 60, induced voltage components of opposite polarities tend to buck one another. The coding wires 58 or 60 therefore effectively serve as parallel input, single output, polarity coding networks for detection of the presence of the sequences . . . 0,0,0,0,1,1,1,1 or . . . 0,0,1,1,0,0,1,1 at their parallel input. In accordance with the conventional principles of communication systems employing codes of predetermined discrimination-enhancing sequences, the output of such a polarity coding network will be greatest only when its own predetermined binary sequence code is present at its input.

The aggregate action of these individual inductive interaction stations T in the detection of binary code sequences is essentially the same as that described in the present joint inventors' copending application S.N. 499,111, except that the structure and mechanism by which the individual inductive interactions take place between the delay line and the code wires are as has just been described with reference to FIG. 2.

Although device 50 has been described for use in detection of a signal, it will be readily appreciated that it can also be employed to generate a coded signal by energizing one of its coding wires 58 or 60 at its output end 26 with an impulse and employing an electrical-acoustical torsion wave transducer as the output. In this instance such transducer (not shown) should be connected to the delay line adjacent to end 26 of the line in order to have the correct arrangement of digits in the output.

An important feature of the present invention is the ease of fabrication of the device, particularly with regard to the stringing of the polarity encoding wires 58, 60. The described mode of interlacing a wire through the slots 56, in selecting one or the other of opposite directions, can be performed rapidly by hand. As the result of the simple motions involved in interlacing through the slots, wires may be applied to comb-shaped element 52 directly from a spool or reel. If large production quantities were desired, the interlacing of the wire could be performed by conventional automatic machinery.

FIG. 3 better depicts the actual proportions of the structure of an operational embodiment of device 50. The relative compactness of this structure may be comprehended from the fact that FIG. 3 is approximately four times actual scale.

FIG. 4 illustrates a modification of the invention employing bifurcated teeth 64, each tooth having a slit 66, which is narrower than the slots between teeth, extending through its center. A closed loop of wire conductor 68 is threaded through each slit 66 and around the shank portion of the comb element 52″. In accordance with well known effects, a short circuited conductor linking a permeable material, the wire conductor loop 68 tends to cause high effective reluctance between adjacent tap stations, which in turn tends to isolate the inductive tap station T″ against intercoupling effects.

FIG. 5, illustrates a modification of an invention in which the "weighting" of the inductive response provided by a particular tap station T‴ is amplified by a factor of 3 by wrapping the codewire 70 through space 56‴ 3 times. It will be readily appreciated that this modification enables the impulse response characteristics of device 50 to be synthesized for multiple level impulse wave signals, or the approximation of analog impulse wave signals.

A still further modification relates to adjusting the weighting of the degree of inductive coupling at the sequence of tap station T along the line. As the acoustic signal travels along the delay line wire it experiences attenuation losses. As a result, there is an inherent monotonic decrease of level of element signal induced into the code wire from a given torsional pulse, in the direction of propagation along the delay line. This, in turn, produces undesired non-linear effects in the response characteristic of device 50. Device 50 may be modified to compensate for this acoustic signal attenatuion effect by provision of a variable gap between the delay line and the surface of the teeth of the comb element. By decreasing the gap in the direction of propagation along the delay line, the decrease in amplitude of the pulse under attenuation may be compensated by the increase in inductive coupling. Weighting the degree of coupling along the line in accordance with a predetermined function may be desired for purposes of synthesizing different impulse response effects as well.

Obviously many modifications and variations of the present invention are possible in the light of the above teachings. It is therefore to be understood that the invention may be practiced otherwise than as specifically described.

What is claimed is:

1. In a torsional delay line signal processing device, capable of being used for signal detection or signal generation, of the type having a matched filter response characteristic corresponding to a first predetermined sequence of N binary digits, where N is generally a numerical value in excess of 100, the combination comprising:

an elongated comb-shaped element made of magnetically permeable material, said element having $N+1$ teeth projecting from one of its lateral edges, and forming a linear sequence of N slots between said teeth;

a first code wire, having two ends, threaded through individual successive slots of said linear sequence of N slots in one or the other of the opposite transverse directions to the plane of the comb-shaped element, and around the unslotted portion of the comb-shaped element when a binary digit is the same as the immediately preceding binary digit, in accordance with whether the digit in the corresponding bit position of said first sequence of N binary digits is a zero (0) or a one (1);

both ends of the code wire being adaptable for connection to a detecting means, with current flowing in one direction, when the processing device is used for signal detection, or adaptable for connection to an input signal source, with current flowing in the opposite direction, when used for signal generation;

said first code wire being threaded through successive slots of said comb-shaped element so that the arrangement of different directions of the threading of the wire through the individual slots of the comb in the direction of current flow through the threaded part of the code wire is backward in order relative to the arrangement of the corresponding binary digits in successive bit positions of the binary sequence when the processing device is used for signal detection, and is in the same order as the arrangement of the corresponding binary digits when the processing device is used for signal generation;

a torsional mode acoustic delay line of magneto-elastic metal disposed across the teeth of the comb-shaped element in parallel alignment to the longitudinal axis of the comb-shaped element and outwardly laterally disposed from said code wire, the delay line being adaptable for connection to an electric-acoustic torque-wave transducer; said delay line being in sufficiently close proximity to, but physically separated from, the surface of the magnetic comb-shaped element to provide inductive coupling between the delay line and the code wire;

means electrically coupled with said delay line for producing a field of circular magnetic lines of force about the length of the delay line.

2. Apparatus as defined in claim 1 and further of a type having another independent matched filter response characteristic corresponding to a second predetermined sequence of N binary digits, said apparatus further comprising:

a second code wire having two ends threaded through individual successive slots of said linear sequences of N spaces in one and the other of opposite transverse directions in accordance with whether the digit in the corresponding bit position of said second sequence of N binary digits is a zero (0) or a one (1), both ends of the code wire being adaptable for connection to a detecting means or to an input signal source.

3. Apparatus in accordance with claim 1, and an electrical-acoustic wave transducer disposed at one end of and operatively connected to said delay line.

4. Apparatus in accordance with claim 1, and means for non-rigidly fastening said delay line in such position across said teeth comprising said delay line being encased in a loosely fitting insulator sleeve, said sleeve being rigidly fastened to the comb-shaped element.

5. Apparatus in accordance with claim 1, said magnetically permeable material further being of the type having low electrical conductivity and exhibiting no appreciable remenance.

6. Apparatus in accordance with claim 5, said magnetically permeable material being an alloy of iron containing approximately 12 percent aluminum.

7. Apparatus in accordance with claim 1,
said teeth of the comb-shaped element each being of bifurcate form having a thin slit extending through the center of the tooth, and
a closed loop of conductive wire threaded through each slit and transversely about the comb-shaped element, to reduce unwanted magnetic interaction between adjacent inductive interaction tap stations.

8. Apparatus in accordance with claim 1,
said means for producing a field of magnetic lines of force comprising a voltage source coupled to the ends of the delay line.

9. Combination in accordance with claim 1, wherein at least one of the slots contains a coding wire looped more than once about the comb-shaped element, thereby weighting the signal at that slot.

10. Combination in accordance with claim 1, further comprising:
a loose-fitting insulation sleeve about the delay line for effecting the physical separation between the delay line and the comb-shaped element.

References Cited

UNITED STATES PATENTS

| | | | |
|---|---|---|---|
| 3,357,001 | 12/1967 | Smith et al. | 340—174 |
| 3,371,196 | 2/1968 | Lerwill et al. | 235—181 |

MALCOLM A. MORRISON, Primary Examiner

F. D. GRUBER, Assistant Examiner

U.S. Cl. X.R.

235—197; 333—29, 30; 340—146.2, 174